(12) United States Patent
Ribeiro

(10) Patent No.: US 10,544,829 B1
(45) Date of Patent: Jan. 28, 2020

(54) THRUST BEARING WITH RETENTION FEATURES

(71) Applicant: Schaeffler Technologies AG & Co. KG, Herzogenaurach (DE)

(72) Inventor: Igor Cardozo Mendes Ribeiro, Sterling Heights, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/034,790

(22) Filed: Jul. 13, 2018

(51) Int. Cl.
 *F16C 19/30* (2006.01)
 *F16C 35/06* (2006.01)
(52) U.S. Cl.
 CPC .............. *F16C 19/30* (2013.01); *F16C 35/06* (2013.01)
(58) Field of Classification Search
 CPC ........ F16C 19/30; F16C 19/305; F16C 35/06; F16C 2226/80
 See application file for complete search history.

(56) References Cited

U.S. PATENT DOCUMENTS

| | | | | | |
|---|---|---|---|---|---|
| 3,059,950 | A | * | 10/1962 | Hedges | B62D 7/16 403/74 |
| 3,501,210 | A | * | 3/1970 | Deutsch | F16C 33/60 384/564 |
| 5,899,428 | A | * | 5/1999 | Gauger | B60N 2/067 248/419 |
| 9,581,193 | B2 | * | 2/2017 | Brzezinski | F16C 19/381 |

* cited by examiner

*Primary Examiner* — Thomas R Hannon
(74) *Attorney, Agent, or Firm* — Antun M. Peakovic

(57) ABSTRACT

Thrust bearings and etched surfaces thereof are disclosed. The thrust bearing may include a first washer, a second washer, and a plurality of rolling elements disposed between the first and second washers. A radial surface of at least one of the first or second washer may be configured to be press fit onto or into a component. The radial surface may include a plurality of etched regions, each etched region including a valley that extends below a non-etched portion of the radial surface and a peak that extends around the valley and extends above the non-etched portion of the radial surface. The peaks of the etched regions may be configured to contact the component and increase an interference between the radial surface and the component.

12 Claims, 3 Drawing Sheets

THRUST BEARING WITH RETENTION FEATURES

TECHNICAL FIELD

The present disclosure relates generally to a thrust bearing with retention features, for example, etched regions.

BACKGROUND

In general, bearings are used to permit rotation between two components. Radial bearings typically support radial loads, while thrust bearings typically support axial loads. Thrust bearings may be used in a wide range of applications where rotation is necessary but an axial load is present. For example, thrust bearings may be used in vehicles, such as in vehicle engines and related systems.

SUMMARY

In at least one embodiment, a thrust bearing is provided. The thrust bearing may include a first washer; a second washer; a plurality of rolling elements disposed between the first and second washers; and a radial surface of at least one of the first or second washer configured to be press fit onto or into a component. The radial surface may include a plurality of etched regions, each etched region including a valley that extends below a non-etched portion of the radial surface and a peak that extends around the valley and extends above the non-etched portion of the radial surface. The peaks of the etched regions may be configured to contact the component and increase an interference between the radial surface and the component.

The etched regions may be spaced apart from each other, e.g., evenly spaced apart from each other. The etched regions may be formed in a pattern on the radial surface, such as a dot matrix pattern of circular etched regions or spaced apart linear etched regions. A spacing between adjacent etched regions may be 10 to 500 μm. A width of the etched regions may be 1 to 500 μm. A depth of the etched regions may be 1 to 100 μm. In one embodiment, the radial surface is an outer radial surface of the first or second washer and the component is a housing and the outer radial surface is configured to be press fit into the housing. In another embodiment, the radial surface is an inner radial surface of the first or second washer and the component is a rotating component and the inner radial surface is configured to be press fit into the rotating component.

In at least one embodiment, a method is provided. The method may include etching a plurality of regions of a radial surface of a thrust bearing washer using a laser to form a plurality of etched regions. Each etched region may include a valley that extends below a non-etched portion of the surface and a peak that extends around the valley and extends above the non-etched portion of the surface.

The etching may include forming the etched regions in a pattern on the surface, such as a dot matrix pattern of circular etched regions or spaced apart linear etched regions. The method may include press fitting the thrust bearing washer into a housing or onto a rotating component, such that the peaks of the etched regions are in contact with the housing or the rotating component and increase an interference between the surface and the housing or the rotating component. In one embodiment, the radial surface is an outer radial surface, and the thrust bearing washer is press fit into the housing. In another embodiment, the radial surface is an inner radial surface, and the thrust bearing washer is press fit onto the rotating component.

In at least one embodiment, a thrust bearing assembly is provided. The thrust bearing assembly may include a housing; a first washer; a second washer; and a plurality of rolling elements disposed between the first and second washers. A radial surface of the first washer may be press fit into the housing. The radial surface may include a plurality of etched regions, each etched region including a valley that extends below a non-etched portion of the radial surface and a peak that extends around the valley and extends above the non-etched portion of the radial surface. The peaks of the etched regions may contact the housing and increase an interference between the radial surface and the housing.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
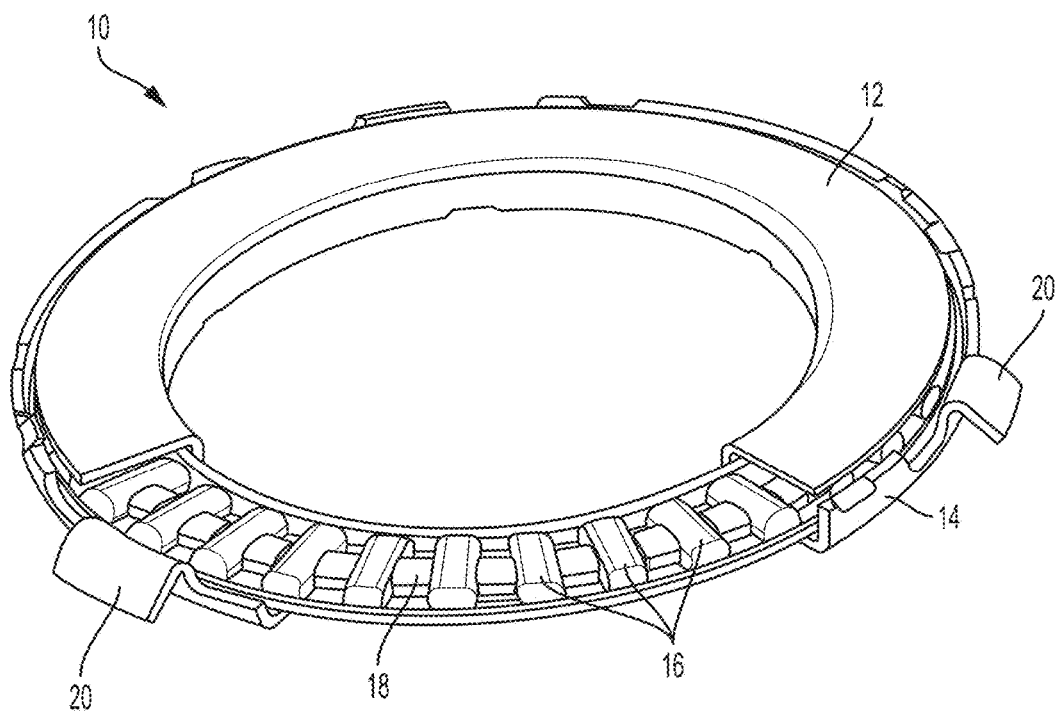
FIG. 1 is a perspective view of thrust bearing including anti-rotation tabs, according to an embodiment.

With reference to FIG. 1, a thrust bearing 10 is shown. The thrust bearing 10 may include an inner washer 12 (or ring) and an outer washer 14 (or ring). Instead of "inner" and "outer," the washers may also be referred to as first and second washers. A plurality of rolling elements 16 may be disposed between the inner and outer washers and the rolling elements 16 may be held or secured by a cage 18. In use, the inner washer 12 may be secured (e.g., by interference or press fit) to one component and the outer washer 14 may be secured (e.g., by interference or press fit) to another component, thus allowing the two components to rotate relative to each other. One of the components may be held stationary, in which case the washer secured thereto may be referred to as a stator and the other washer may be referred to as a rotor.

In one example, the outer washer 14 may be secured to a housing, which may be configured to be stationary. The outer washer 14 may be press fit into the housing. However, due to the rotational forces applied during rotation of the bearing, it may be possible for the outer washer 14 to move relative to the housing in some operating conditions. Accordingly, in one embodiment, one or more anti-rotation tabs 20 may be included on the outer washer 14. These tabs may be received by corresponding slots or openings in the housing such that they lock the outer washer 14 in position in the circumferential direction and prevent rotation of the outer washer 14 relative to the housing.

While the anti-rotation tabs 20 may be effective at preventing or reducing rotation between the outer washer 14 and the housing, there may be some issues related to the tabs. One potential issue with the tabs is that they may have cracks formed therein—either during formation, handling, or operation over their lifetime. When these cracks are formed, they may release small metal particles. These particles may then contaminate the bearing system or nearby systems, which may reduce the lifetime of the components. In addition to potential cracks (or alternatively), the addition of the tabs to the outer washer (or inner, depending on configuration) may increase the cost and/or complexity of the production process. The forming of the tabs may require an extra step in the manufacturing process, which typically increases costs and adds time to production.

Figure 2:
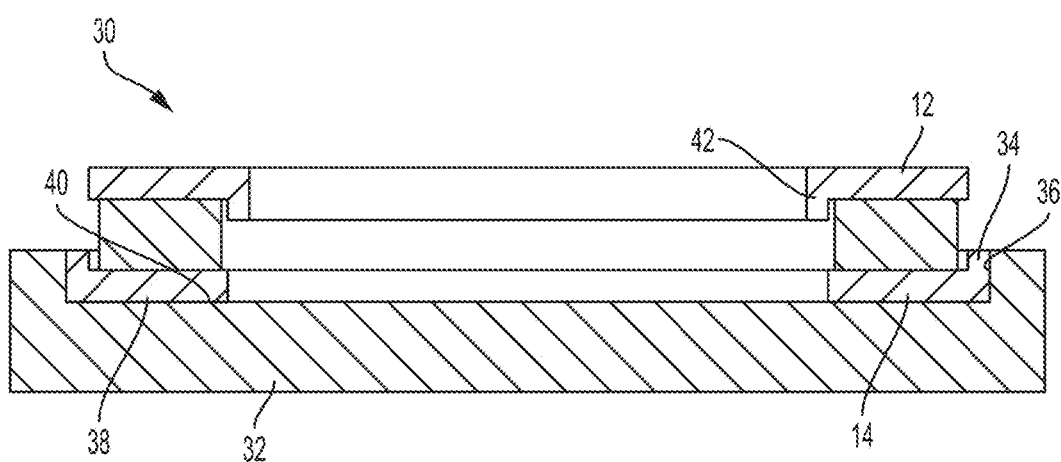
FIG. 2 is a cross-section of a thrust bearing without anti-rotation tabs press fit into a component, according to an embodiment.

With reference to FIG. 2, another embodiment of a thrust bearing 30 is shown. Thrust bearing 30 may be similar to thrust bearing 10, and similar components are numbered the same. The cross-section shown in FIG. 2 is simplified for illustration purposes, for example, the cage 18 is not shown. One difference between bearings 10 and 30 is that the thrust bearing 30 does not include the anti-rotation tabs 20. Instead, the outer washer 14 is secured, at least primarily, to a housing 32 by a press (interference) fit. In the embodiment shown, a radially outer surface 34 of the outer washer 14 is press fit to an inner surface 36 of the housing 32 that extends in the axial direction (e.g., vertically, as shown). The inner surface 36 may be substantially cylindrical to receive the outer washer 14. An axially outer surface 38 of the outer washer 14 may also contact an axial surface 40 of the housing, which may be referred to as a backup surface.

As described with reference to thrust bearing 10, without the anti-rotation tabs 20, the outer washer 14 may be susceptible to rotation relative to the housing 32 (e.g., relative to the inner surface 36 and backup surface). However, in at least one embodiment, this relative rotation is prevented or reduced by roughening or etching the radially outer surface 34 of the outer washer 14 and/or the inner surface 36 of the housing 32. In some embodiments, the axially outer surface 38 and/or the axial surface 40 may also (or alternatively) be roughened or etched. By roughening or etching one or both of the opposing surfaces of the outer washer 14 and the housing 32, the interference between the surfaces may be increased, thereby making it more difficult for them to rotate relative to each other.

While the embodiments above have been described with the outer washer 14 having the roughened or etched surfaces, a corresponding process or method may also be applied to the inner washer 12—either in addition to, or instead of, the outer washer 14. In these embodiments, the inner washer 12 may be the washer secured to the housing or the inner washer may be secured to a different component (e.g., a rotating component, such as a shaft). Instead of a radially outer surface 34 being roughened/etched, it may be the radially inner surface 42.

In at least one embodiment, the radially outer surface 34 of the outer washer 14, the inner surface 36 of the housing 32, the axially outer surface 38, and/or the axial surface 40 may be etched, e.g., by laser etching. The etched surface may include a plurality of peaks and valleys relative to the initial/original surface prior to etching. Accordingly, the etched surface may increase the surface roughness compared to an original surface (e.g., nominal surface) having an initial surface roughness. In addition, the etching may be present in a pre-determined pattern, such that it is distinguished from the random or irregular roughness of a surface, such as a machined, cast, or forged surface.

Figure 3:
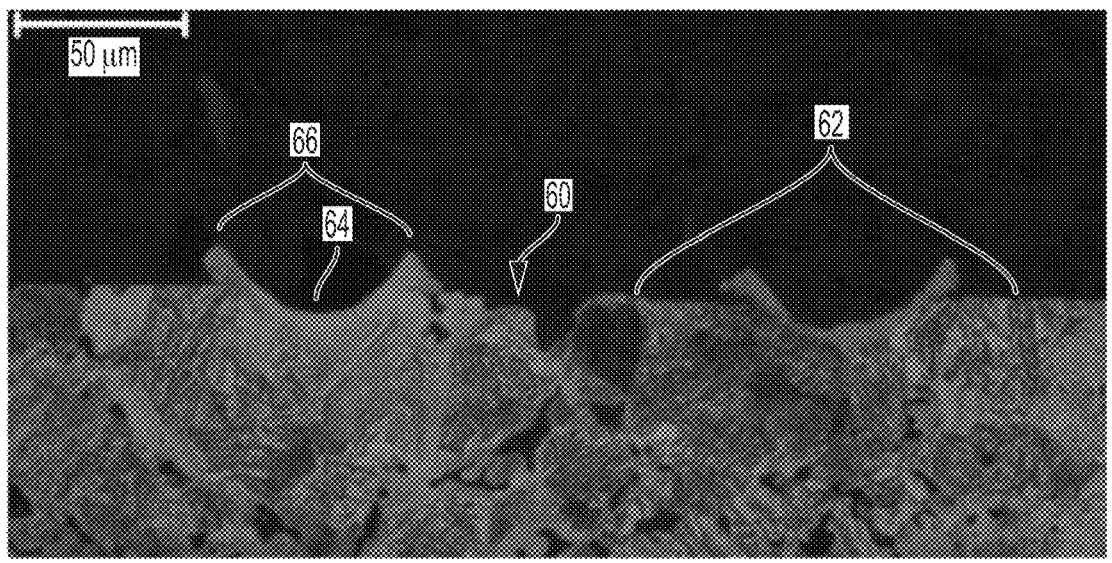
FIG. 3 is an example cross-section of a surface treated by laser etching.

With reference to FIG. 3, a cross-section of a laser etched surface 60 is shown. The original (pre-etching) surface 62 is shown, along with two etched regions. The etched regions include a valley 64 and surrounding peaks 66. During laser etching, the laser may impact the surface 60 and may remove a small amount of material from the surface to create the valley 64. At least some of this removed material may be moved or re-deposited on the outside of the valley 64 to create the peaks 66. Accordingly, the valleys 64 may represent a depression in the surface 62 and the peaks 66 may represent a protrusion from the surface 62. Therefore, a height of the surface 62 may be between a height of the valleys 64 and peaks 66.

Figure 4:
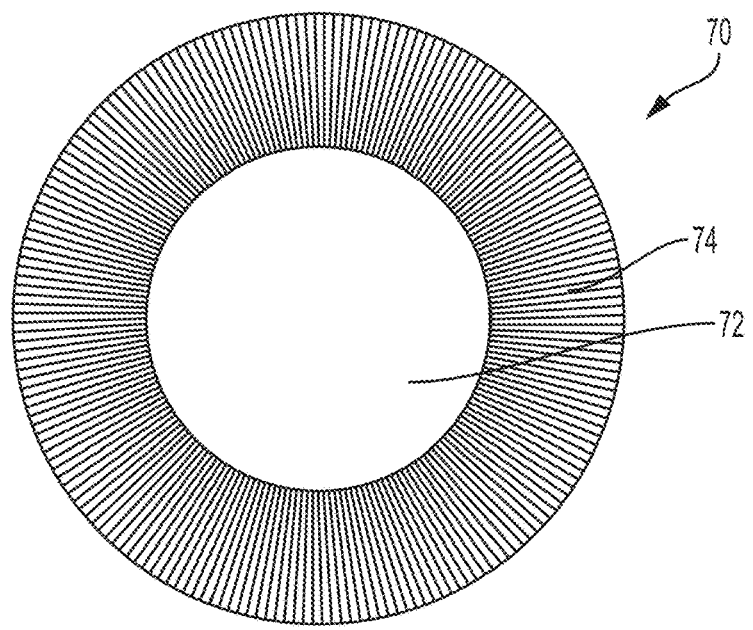
FIG. 4 is a schematic top view of an etched region of the surface of FIG. 3.

With reference to FIG. 4, a schematic top plan view of an etched region 70 is shown, according to one embodiment. In this embodiment, the etched region 70 has a generally circular footprint. This type of etched region may be a result of a laser etch in which the laser beam was stationary relative to the surface during the etching treatment. The laser beam may have a generally circular cross-section, resulting in the generally circular etched region 70. The middle region may represent a valley 72 (similar to valley 64) and the annular outer region may represent the peak 74 (similar to peaks 66). Accordingly, the etched region 70 may be analogous to a crater on the earth's surface, having a circular depression (relative to the surface) and a protruding peak or ridge that extends around a circumference/periphery of the depression and upwards from the surface.

Figure 5A:
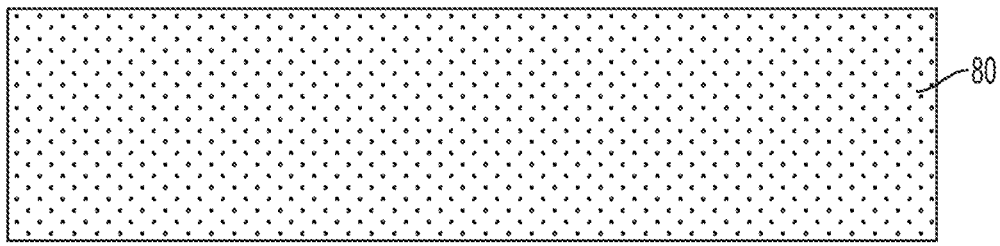
FIGS. 5A, 5B, and 5C are schematic illustrations of laser etching patterns according to several embodiments.
Figure 5B:
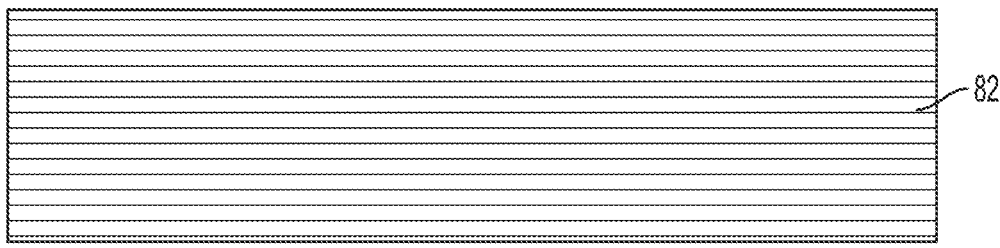
Figure 5C:
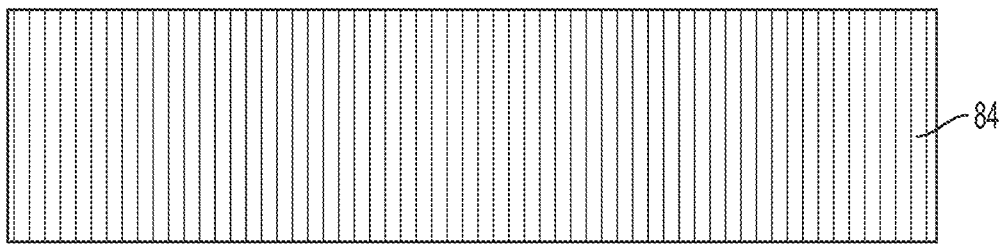

With reference to FIGS. 5A-5C, schematic representations of laser etching patterns are shown on a schematic surface of the inner or outer washers. The patterns are shown as rectangles, which may represent the radially outer surface 34 of the outer washer 14, the inner surface 36 of the housing 32, the axially outer surface 38, and/or the axial surface 40 "unrolled" into a flat surface. The patterns shown are merely examples, and one of ordinary skill in the art will understand, based on the present disclosure, that other patterns may be used.

FIG. 5A shows a dot matrix pattern 80, or an array, which includes a plurality of circular etched regions, similar to the region 70 in FIG. 4. The pattern 80 may include a plurality of rows of etched regions. The dot matrix pattern 80 may be formed by performing a stationary laser etch to form one dot and then moving the laser relative to the surface before performing another stationary etching process (repeat). Adjacent rows may be offset from each other, as shown, or each row may be aligned with each other to form uniform columns. While several patterns are described, any type of predetermined pattern may be used in accordance with the disclosure. In one embodiment, a spacing between adjacent etched regions (e.g., the closest etched region) may be from 10 to 500 μm, or any sub-range therein. For example, the spacing may be 10 to 250 μm, 10 to 150 μm, 25 to 150 μm, 50 to 150 μm, 50 to 100 μm or about 75 μm (e.g., ±10 μm).

With reference to FIGS. 5B-5C, examples are shown of linear etched patterns (e.g., elongated). In FIG. 5B, the linear etched pattern 82 includes a plurality of linear etched regions that extend horizontally (as shown), which represents the circumferential direction if applied to the inner/outer radial surfaces. The linear etched regions may be formed by moving the laser relative to the surface while etching to form an elongated valley and surrounding peaks. The laser may then be moved laterally and another linear etching region is formed in a similar manner. A cross-section of the linear etched region, perpendicular to the long axis, would look similar to that of FIG. 3 for a circular etched region. The linear etched regions may extend continuously around an entire circumference of the inner/outer radial surfaces, as shown, or they may be intermittent (e.g., dashed lines).

In FIG. 5C, the linear etched pattern 84 includes a plurality of linear etched regions that extend vertically (as shown), which represents the axial direction if applied to the inner/outer radial surfaces. The pattern 84 may be formed similar to pattern 82, except that the linear etching regions are formed in a perpendicular direction. The spacing between linear etching regions in either pattern 82 or 84 may be selected from the same spacings described for the dot matrix pattern 80. As with pattern 82, the pattern 84 may extend continuously from one axial side of the inner/outer radial surfaces to the other, as shown, or they may be intermittent (e.g., dashed lines).

While patterns are shown with the linear etching regions being spaced parallel lines extending either circumferentially or axially, other patterns may be used. For example, the etching lines may zig-zag, may have a wave pattern (e.g., sine, square, triangular, etc.), may intersect with each other (e.g., cross-hatch), or have any other desired pattern. As described above, the lines may be continuous or intermittent (e.g., dotted or dashed).

The dimensions of the etched regions may vary depending on the laser parameters, such as the laser power/energy, the beam size, the duration of the exposure for each etched region, or others. In one embodiment, the diameter or width of the valley may be from 1 to 500 μm, or any sub-range therein. For example, the diameter/width of the valley may be 5 to 250 μm, 10 to 250 μm, 10 to 100 μm, 25 to 75 μm, or about 50 μm (e.g., ±10 μm). In embodiments where the etched region is circular, the width and diameter may be the same. In embodiments where the etched region is elongated or linear, the above dimensions may apply to the width (e.g., the smaller axis).

The depth of the etched regions may similarly vary based on the laser parameters. The depth may be defined as the height from the bottom of the valley to the top of the peak(s). In one embodiment, the depth may be from 1 to 100 μm, or any sub-range therein. For example, the depth may be 1 to 75 μm, 5 to 75 μm, 5 to 50 μm, 10 to 50 μm, or about 30 μm (e.g., ±10 μm). These depth dimensions may apply to circular or elongated/linear etched regions.

The etching pattern, such as those shown in FIGS. 5A-5C, may be applied to the radially outer surface 34 of the outer washer 14, the inner surface 36 of the housing 32, the axially outer surface 38, and/or the axial surface 40. The etching may also (or alternatively) be applied to any other surface for which increased interference is desired. While an axial thrust bearing is shown, the disclosed etching may be applied to other bearing types, as will be understood by one of ordinary skill in the art in light of the present disclosure. For example, the etching may be applied to axial bearings having other rolling element types, such as those with spherical rollers, tapered rollers, barrel-shaped spherical rollers, or others, as well as double/tandem bearings. It may also be applied to radial bearings or other types of bearings where increased interference is desired between a bearing component and another component.

The etching pattern (e.g., laser etching pattern) may be applied to all of the surface to which it is applied, or only a portion thereof. For example, the laser etching patterns (e.g., those in FIGS. 5A-5C) may be applied to the entire radially outer surface 34 of the outer washer 14, the inner surface 36 of the housing 32, the axially outer surface 38, and/or the axial surface 40, or only to a portion or portions thereof. In one embodiment, the etching pattern may be applied to at least 50% of the surface area of the surface to which it is applied (e.g., the inner and/or outer radial surface), for example, at least 75%, 85%, or 95%. The etched area may be continuous and/or contiguous, or it may be split into two or more regions. If there are multiple regions, they may be spaced around the circumference of the radial surfaces (e.g., equally spaced).

The etched regions, having peaks and valleys relative to the original surface, may increase the level of interference between the bearing component and a component that it is press-fit thereto. Without being held to any particular theory, it is believed that the peaks that extend beyond the surface will cause an increase in friction between the bearing component and the mating component. Accordingly, by providing a plurality of etched regions, such as in the patterns disclosed, the friction between the two components may be increased along an entire interface therebetween, or at least a portion thereof. If creep is found to be an issue in, or because of, only a certain region or regions, the laser etching may be applied only in that region or regions. However, in other embodiments, the laser etching may be applied to the whole interface surface.

In at least one embodiment, the etched regions on the bearing component(s) may provide sufficient interference such that other retention features are not necessary and may be eliminated. For example, laser etching as described herein may render retention features such as those shown in FIG. 1 unnecessary. Therefore, in at least one embodiment, a bearing assembly may include the laser etching regions but may not include any other retention features, such as those described. Stated another way, the inner and/or outer rings may be flush on their radial faces and may not include any projections or retention tabs or flattened regions. In addition, the radial surfaces may have a constant diameter (e.g., on a macro scale, excluding roughness or peaks/valleys).

The laser etching process may be performed using any suitable laser type and according to any suitable laser etching process. In general, the laser etching process may be performed using a laser and an associated controller, which may be used to control the movement of the laser, the pattern of the laser irradiation, and/or the laser parameters (e.g., power, spot size, dwell time, etc.). The laser and/or the component to be etched may be connected to or secured by a CNC machine to move it in two or three dimensions. The parameters of the laser may be adjusted based on factors such as the desired valley width/depth, the type of material being etched (e.g., metal for a bearing ring), the amount of surface to be etched, or others. One example of a laser etching system may be the TruMark 6130 from TRUMPF, which may have a frequency of about 100 kHz, a beam/trace width of about 50 μm, and a beam velocity of about 300 mm/s. Of course, one of ordinary skill in the art will understand that these parameters are merely an example and that, based on the present disclosure, other parameters may be used.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS thrust bearing 10
inner washer 12
outer washer 14
rolling elements 16
cage 18
anti-rotation tabs 20
thrust bearing 30
housing 32
radially outer surface 34
inner surface 36
axially outer surface 38
axial surface 40
radially inner surface 42
laser etched surface 60
original surface 62
valleys 64
peaks 66
laser etched region 70
valley 72
peak 74
dot matrix pattern 80
circumferential line pattern 82
axial line pattern 84

What is claimed is:

1. A thrust bearing, comprising:
   a first washer;
   a second washer;
   a plurality of rolling elements disposed between the first and second washers;
   a radial surface of at least one of the first or second washer configured to be press fit onto or into a component; and
   the radial surface including a plurality of etched regions, each etched region including a valley that extends below a non-etched portion of the radial surface and a peak that extends around the valley and extends above the non-etched portion of the radial surface;
   wherein the peaks of the etched regions are configured to contact the component and increase an interference between the radial surface and the component.

2. The thrust bearing of claim 1, wherein the etched regions are spaced apart from each other.

3. The thrust bearing of claim 1, wherein the etched regions are evenly spaced apart from each other.

4. The thrust bearing of claim 1, wherein the etched regions are formed in a pattern on the radial surface.

5. The thrust bearing of claim 4, wherein the pattern is a dot matrix pattern of circular etched regions.

6. The thrust bearing of claim 4, wherein the pattern includes spaced apart linear etched regions.

7. The thrust bearing of claim 1, wherein a spacing between adjacent etched regions is 10 to 500 μm.

8. The thrust bearing of claim 1, wherein a width of the etched regions is 1 to 500 μm.

9. The thrust bearing of claim 1, wherein a depth of the etched regions is 1 to 100 μm.

10. The thrust bearing of claim 1, wherein the radial surface is an outer radial surface of the first or second washer and the component is a housing and the outer radial surface is configured to be press fit into the housing.

11. The thrust bearing of claim 1, wherein the radial surface is an inner radial surface of the first or second washer and the component is a rotating component and the inner radial surface is configured to be press fit into the rotating component.

12. A thrust bearing assembly, comprising:
   a housing;
   a first washer;
   a second washer;
   a plurality of rolling elements disposed between the first and second washers;
   a radial surface of the first washer press fit into the housing; and
   the radial surface including a plurality of etched regions, each etched region including a valley that extends below a non-etched portion of the radial surface and a peak that extends around the valley and extends above the non-etched portion of the radial surface;
   wherein the peaks of the etched regions contact the housing and increase an interference between the radial surface and the housing.

* * * * *